United States Patent [11] 3,597,816

| [72] | Inventor | Martin L. Zelenz<br>Seneca Falls, N.Y. |
|---|---|---|
| [21] | Appl. No. | 801,115 |
| [22] | Filed | Feb. 20, 1969 |
| [45] | Patented | Aug. 10, 1971 |
| [73] | Assignee | Sylvania Electric Products Inc. |

[54] APPARATUS FOR FABRICATING MULTILAYER ELECTRICAL COMPONENTS
8 Claims, 12 Drawing Figs.

[52] U.S. Cl. .................................................. 29/25.42,
29/203 L, 29/203 R, 83/79, 156/261, 156/515, 156/518, 270/58
[51] Int. Cl. ............................................... H01g 13/00
[50] Field of Search .......................................... 29/25.42,
205, 203 L, 203 R; 270/58; 83/29; 156/515, 518, 261; 317/261

[56] References Cited
UNITED STATES PATENTS

| 907,690 | 12/1908 | Harbeck ..................... | 83/100 |
| 2,440,347 | 4/1948 | Poitras ........................ | 29/25.42 |
| 2,531,389 | 11/1950 | Brandt ......................... | 29/25.42 |
| 2,839,816 | 6/1958 | McGraw ....................... | 29/25.42 |
| 3,456,313 | 7/1969 | Rodriquez et al. ............ | 29/25.42 |

Primary Examiner—John F. Campbell
Assistant Examiner—Carl E. Hall
Attorneys—Norman J. O'Malley, Cyril A. Krenzer and William H. McNeill ABSTRACT: Method and apparatus for forming thick-film electrical capacitors. Strips of electrically conducting and electrically insulating material are fed in an overlapping manner to a cutting area. The strips are cut under sufficient pressure to form a bonded pair which is then transported to a remote position. Alignment between the bonded pair and a receptacle is achieved and the bonded pair is deposited therein. The cycle is repeated with the receptacle being rotated 180°. The rotation of the receptacle between cycles allows an interleaved capacitor of any desired size to be built up. When this is achieved, the receptacle may be removed to a die where sufficient pressure is applied to achieve adherence of all bonded pairs into a compact unit. This unit is then fired at selected temperatures to produce the capacitor.

INVENTOR.
MARTIN L. ZELENZ
BY
ATTORNEY

INVENTOR
MARTIN L. ZELENZ
ATTORNEY

INVENTOR.
MARTIN L. ZELENZ

BY

ATTORNEY

Patented Aug. 10, 1971

INVENTOR.
MARTIN L. ZELENZ

BY

ATTORNEY 3,597,816

APPARATUS FOR FABRICATING MULTILAYER ELECTRICAL COMPONENTS

BACKGROUND OF THE INVENTION

This invention relates to methods and apparatus for handling self-supporting strip material and more particularly to methods and apparatus for fabricating electrical capacitors from conductive and dielectric strip material.

The use of thick film electrical components is known in the electronics industry and has gained wide acceptance over the past few years in relation to the miniaturization of various electrical circuits. Generally, the prior art methods of manufacturing thick film capacitors has left much to be desired. The various techniques employed have included the formulation of dielectric and conductive materials in organic binders to form slurries, and then successively painting or silk screening these materials alternately one upon the other until the desired number of layers was realized. The obvious disadvantage from this technique stems from the lack of control over the amount of material being applied and thus the ultimate capacitance of the finished device.

Some of these disadvantages have been obviated by a process of casting both the dielectric material and the conductive material into the form of self-supporting strips. These strips are held together by an organic binder which is baked off after the component is assembled. The self-supporting material is capable of extremely accurate controls as regards thickness and width, and thus electrical characteristics of given segments of the material are far more accurately controllable than was the case with prior art methods. However, disadvantages are also present with the self-supporting strip material as regards the making of capacitors. These are the ability to consistently cut the material to accurate dimensions and the amount of labor involved in assembling the alternate layers of dielectric and conductive material in the proper manner to form a capacitor. This includes, obviously, the necessity of having the alternate conducting layers offset from one another in typical fashion. This in the past has been a hand operation and the resulting product depended in great part upon the skill of the operator.

OBJECTS AND SUMMARY OF THE INVENTION

It is therefore an object of the invention to obviate the above-cited disadvantages of the prior art.

Yet another object of the invention is the enhancement of assembly operations involved in the manufacture of multilayer electrical components.

It is still another object of the invention to provide method and apparatus for fabricating thick-film capacitors.

The above objects are carried out in one aspect of the invention by the provision of an apparatus for fabricating multilayer electrical components from two different compositions of self-supporting strip material which comprises first and second strip-feeding means disposed substantially 90° apart for feeding the strips, in an overlapping manner, to a particular location. First and second supply means for the strips are also provided and are operatively connected to the first and second feed means. Formed adjacent the particular location is a cutting and temporary bonding means for cutting the overlapped strips and causing adherence therebetween thereby forming a bonded pair. Means associated with the cutting means removes the bonded pair to a position remote from the particular location and also includes means for depositing the bonded pair in a predetermined area. Means for causing relative movement between the bonded pair and the predetermined area achieves alignment between the two to insure accurate deposition of the bonded pair.

DESCRIPTION OF THE PREFERRED EMBODIMENTS

For a better understanding of the present invention, together with other and further objects, advantages and capabilities thereof, reference is made to the following disclosure and appended claims in connection with the above-described drawings.

Figure 1:
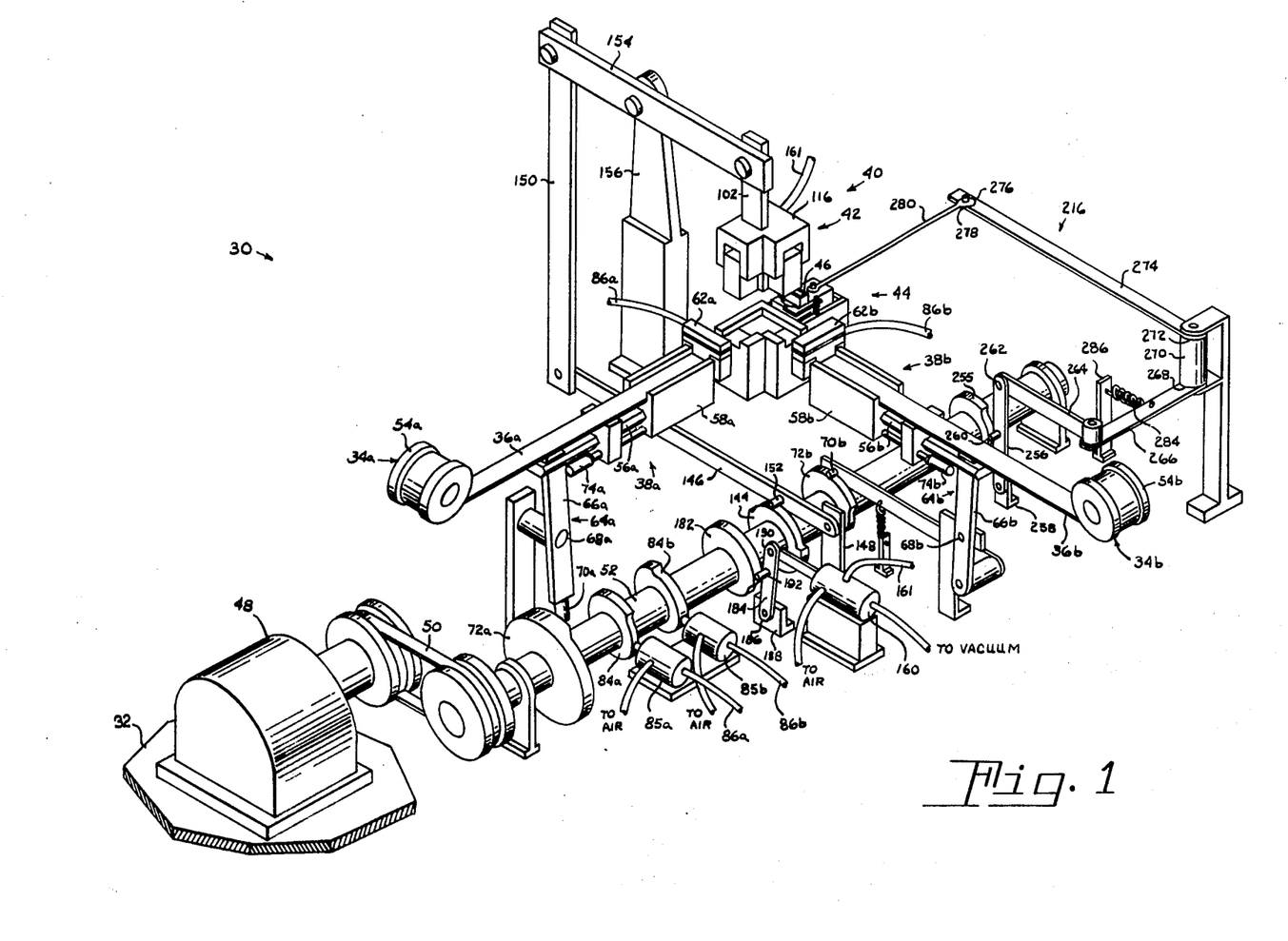
FIG. 1 is a perspective view illustrating one embodiment of the apparatus of the invention.

Referring now to the drawings with greater particularity, there is shown in FIG. 1 an apparatus 30 for providing the functions of feeding, cutting, bonding, transporting and delivering a bonded pair of strip material. Apparatus 30 comprises a base portion 32, only partially shown, having mounted thereon or adjacent thereto first and second supply means 34a and 34b for dissimilar strips 36a and 36b, first and second strip feeding means 38a and 38b, strip cutting means 40, strip transporting means 42 and means 44 for carrying and indexing a rotatable receptacle 46. Drive means 48 in the form of a motor connected by means of a drive belt 50 to a cam shaft 52 is also provided.

The strip supplies for the material 36a and 36b are dependent upon the structure and material strength of the strips and may be, for example, spools or reels 54a and 54b of the material. When the characteristics of the strips 36a and 36b are such that they are not suitable for rolling on a reel, then the strips may be in the form of elongated substantially flat sections, which may be supplied to the strip feed means in any suitable manner.

The strip feed mechanisms 38a and 38b are substantially identical and are similar to that shown in detail in Ser. No. 801,114 filed concurrently herewith. In general, they each comprise, respectively, slides 56a and 56b mounted in slideways 58a and 58b which in turn are mounted upon supporting blocks, not shown. The feeds are positioned at substantially a right angle. Selectively engageable advancing clamps 62a and 62b are mounted at one end of the slides 56a and 56b. The opposite ends of slides 56a and 56b are provided with slide moving means 64a and 64b which are formed for advancing the slides in a first direction and for retracting the slides in a second opposite direction. The slide advancing and retracting means each comprises, respectively, a lever arm 66a and 66b affixed at one end to slides 56a and 56b and have pivot points 68a and 68b substantially intermediate the ends thereof and cam followers 70a and 70b positioned at the other ends thereof. The cam followers 70a and 70b engage strip feed cams 72a and 72b which are mounted upon cam shaft 52. The amount of advance of the slides 56a and 56b is adjustable by means of micrometer adjusters 74a and 74b. Locking screws may also be provided.

The selectively engageable strip-advancing clamps 62a and 62b are identical to that of the above-cited application and their operation will not be detailed here.

The clamps 62a and 62b are air actuated and the actuation is controlled by means of cams 84a and 84b which control air cylinders 85a and 85b. Hose connections 86a and 86b are provided between the air cylinders and the clamps 62a and 62b.

Figure 2:
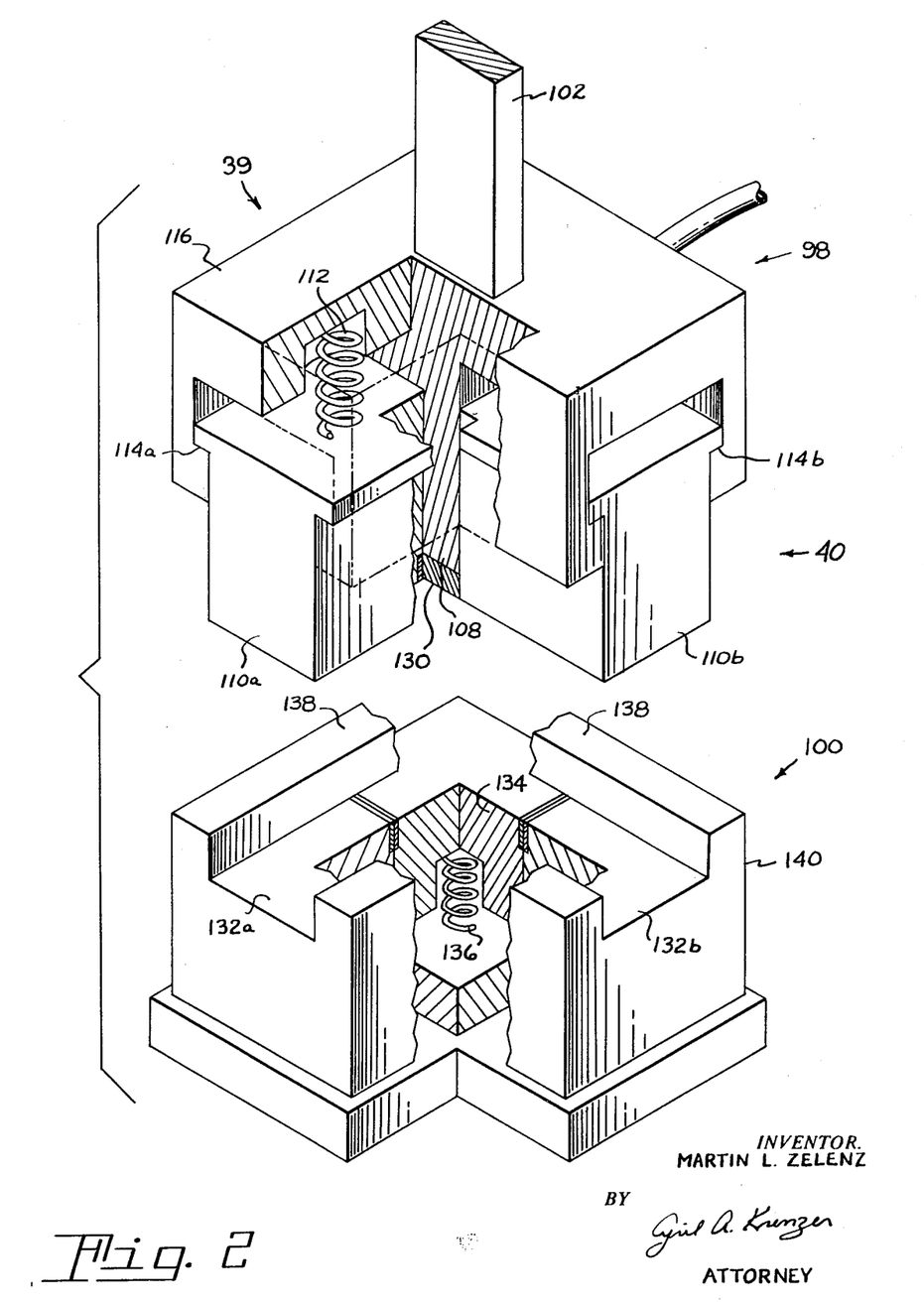
FIG. 2 is a diagrammatic perspective view, with parts broken away, of the cutting head of the apparatus.

Referring now to FIG. 2, the cutting means 39 comprises a strip cutter 40 having upper and lower heads 98 and 100 respectively. In the diagrammatic representation of FIG. 1, the upper head 98 is shown as being mounted on a link 102; however, a mounting plate and suitable guide means such as shown in the above-mentioned concurrently filed application may be utilized. The lower head 100 is generally mounted on a supporting block, which is not shown.

The upper head 98 comprises a fixed member 108 and a pair of tensioned movable members 110a and 110b. The tension for members 110a and 110b may be provided by one or more springs 112, only one of which is shown, which urges the members 110a and 110b downwardly against appropriate stops 114a and 114b which may be formed in a first guide block 116 which is suitably slotted to accept the members 110a and 110b.

Figure 3:
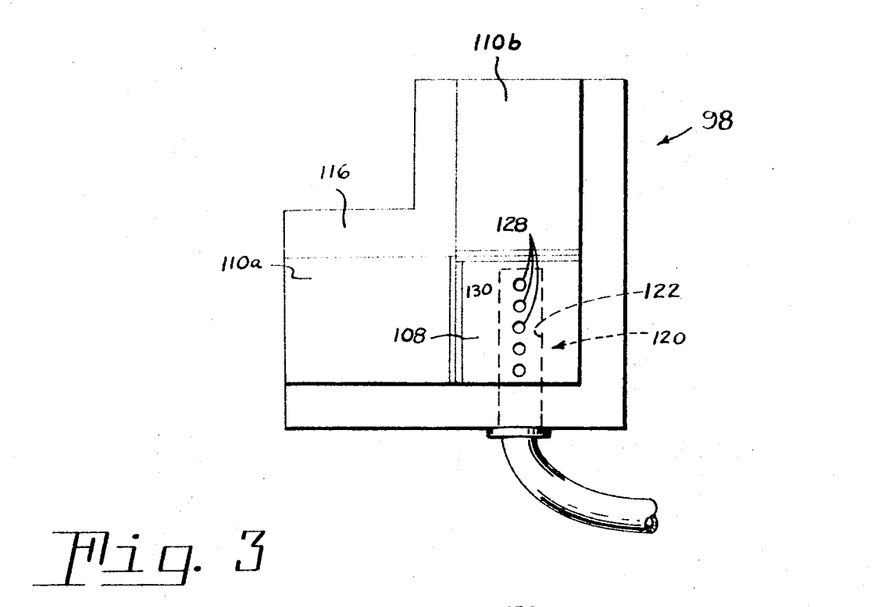
FIG. 3 is an upward-looking plan view of the upper cutting head.

The lower portion of fixed member 108 contains the bonded-pair-transporting means 120 (see FIG. 3). Means 120 comprises a horizontal air chamber 122 extending the length of member 108 and which is connected to a control valve 160. A plurality of apertures 128 connect the chamber 126 with the cutting face 130 which is formed on fixed member 108.

Figure 4:
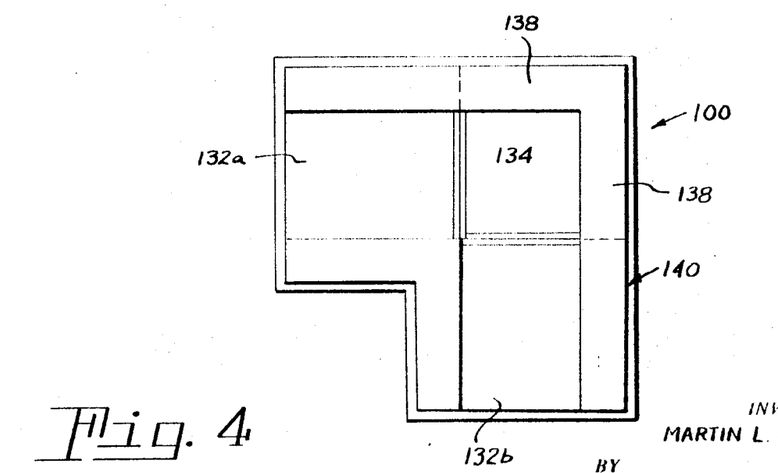
FIG. 4 is a plan view of the lower cutting head.

Lower head 100 comprises a pair of fixed members 132a and 132b and a tensioned movable member 134. The tension for movable member 134 may be provided by one or more springs 136 which urge member 134 upwardly against appropriate stops 138 which may be formed in a second guide block 140 which is suitable slotted to accept member 110. The fixed and movable members of the upper and lower heads are so arranged that during contact of the heads the movable members 110a and 110b of upper head 98 contact the fixed members 132a and 132b of lower head 100 and the fixed member 108 of upper head 98 contacts the movable member 134 of lower head 100. When contact between the heads is achieved, the fixed member 108 and movable member 134 cooperate to function as the cutting and bonding means 39 and the movable members 110a and 110b and the fixed members 132a and 132b cooperate to function as strip-retaining clamps. During the operation cycle of the apparatus, the strip-retaining clamps formed by the head action cooperate with the strip-advancing clamps 62a and 62b to control the amount of strip material 36a and 36b fed into the cutting means. This will be explained in more detail hereinafter.

The reciprocation of the upper head 98 is controlled through a cam 144 mounted on cam shaft 52 and suitable linkage. The linkage comprises a lever arm 146 pivotally mounted at one of its ends in a standard 148 and having a connecting rod 150 at its other end. A cam follower 152 is positioned intermediate the two ends of arm 146 for engagement with cam 144. The end of connecting rod 150 remote from arm 146 is pivotally fastened to a second lever arm 154 which is pivotally mounted substantially centrally of its length on a support 156. The end of second arm 154 remote from connecting rod 150 is fastened, through suitable linkage 102, to the upper surface of guide block 116 of head 98.

The air supply to strip transporting means 120 is controlled by valve 160 which will apply negative, positive, or neutral air to chamber 122 through a hose 161. A valve which will supply these functions is disclosed in the above-cited concurrently filed application and need not be recited here in detail.

Valve 160 is controlled by cam 182 on cam shaft 52 and suitable connecting linkage. The linkage comprises a pivoted arm 184 mounted at one end 186 on a standard 188. The other end 190 is connected to the piston of valve 160. Intermediate the ends of arm 184 is a cam follower 192 for contacting cam 182.

Figure 5:
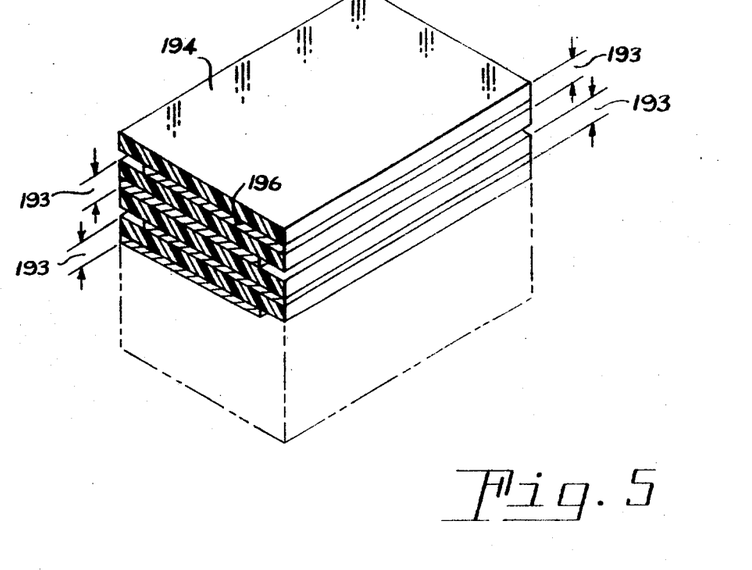
FIG. 5 is a partial perspective view of a multilayer electrical component fabricated by the apparatus of the invention.

During the cutting action referred to above, sufficient pressure is applied to the two dissimilar strips to cause them to achieve at least a temporary bond therebetween. The bonded pair is referred to herein as 193. FIG. 5 shows a partial view of a plurality of bonded pairs 193 alternately arrayed in a stack to form a capacitor. In this particular embodiment the bonded pairs are composed of a strip of dielectric material 194 and a strip of electrically conductive material 196. The electrically conductive material is smaller in width than the dielectric and is asymmetrically disposed thereon whereby the edges of the strips are in alignment on three sides only. The alternate array of the bonded pairs can be clearly seen in FIG. 5. Electrical connection to the plates, or electrical strips of such a device, is generally made by means of conductive paint or epoxy applied to the sides of the device. This method of connection is well understood in the art and needs no further explanation here.

Referring now to FIGS. 6—11, there is shown therein means 44 for carrying and indexing receptacle 46 which will receive the bonded pairs 193.

Figure 6:
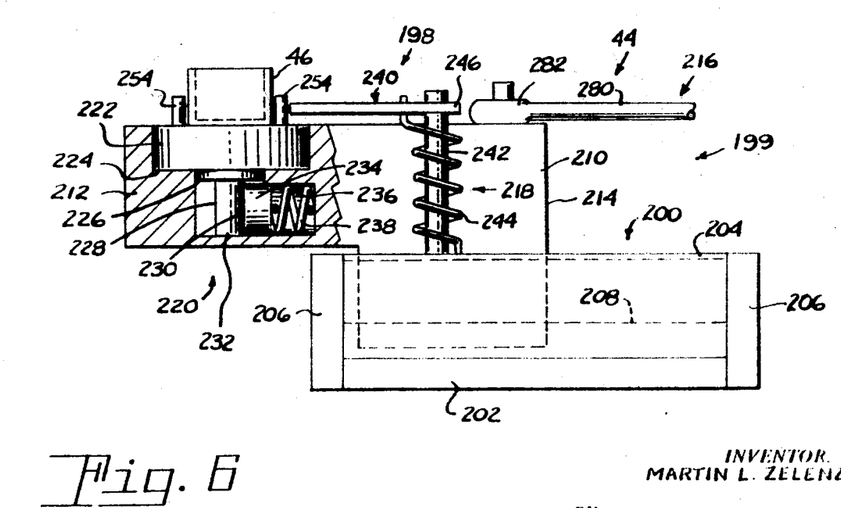
FIG. 6 is a side elevational view, with some parts in section, illustrating the receptacle carrying slide.
Figure 7:
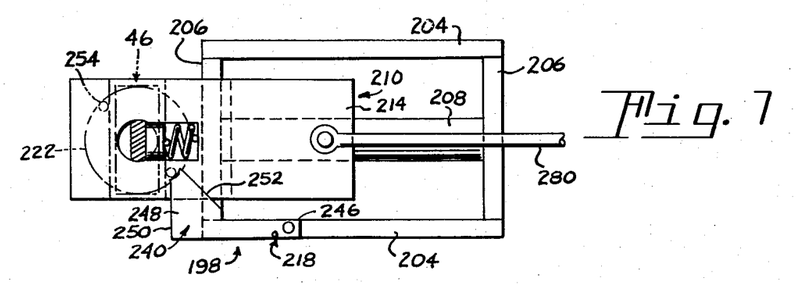
FIGS. 7—11 are plan views of the receptacle-carrying slide illustrating the sequence of operation for rotating the receptacle 180° between cycles of the apparatus.
Figure 8:
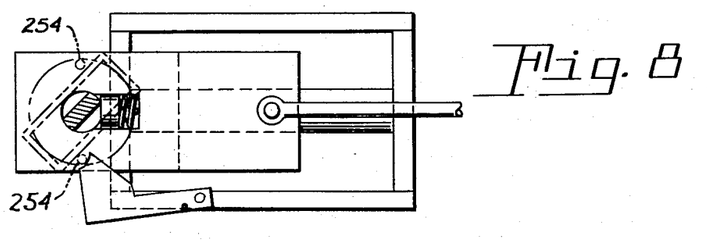
Figure 9:
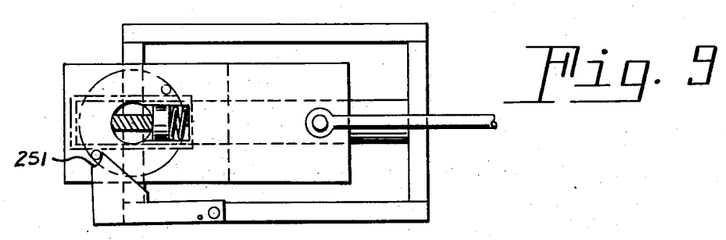

The receptacle 46 comprises a boxlike structure having length and width dimensions formed to accommodate the larger of the strips of the bonded pairs (in this instance, the dielectric strip 194) and a depth sufficient to accommodate a given number of the bonded pairs. While in this instance the configuration of the receptacle 46 is shown to be rectangular, it is to be noted that this is exemplary only, and, obviously, other shapes may be utilized.

Receptacle rotating means 198 is also provided and will be explained in detail hereinafter.

The receptacle 46 is capable of transverse movement so that it may be indexed into and out of alignment with the bonded pair transporting means 120.

The indexing means or the transverse movement providing means 199 generally comprises a slideway 200 having a base 202, sidewalls 204 and end walls 206. A rectangular bar 208 extends between end walls 206 and mounts slide 210 thereon. Slide 210 is formed to project over the walls of the slideway and has oppositely disposed ends 212 and 214. Linkage 216, to be explained in detail hereinafter, connects to end 214 for imparting the movement to the slide 210. End 212 of slide 210 is formed to accept the receptacle 46.

The receptacle rotating means 198 is composed of two segments; initial rotating means 218 which is external of slide 210 and finishing rotating means 220 which is formed internally of slide 210.

The finishing or internal means 220 comprises a cylindrical base 222 for receptacle 46 which seats in a cylindrical chamber 224 formed in slide 210. An axially aligned depending rod 226 projects from the underside of base 222 and has its lower portion provided with opposed flat surfaces 228 and 230 which are parallelly aligned with one of the sides of receptacle 46. The flat surfaces 228 and 230 are joined by curved surfaces 232. A tensioned receptacle alignment slug 234 is positioned in a suitable opening 236 in the slide 210, at substantially a right angle to the axis of depending rod 226, and has a flat base formed to contact one or the other of the flat surfaces 228 or 230. Tension is supplied to the slug by means of a spring 238.

The initial or external rotating means 218 comprises a tensioned pawl 240 mounted on an upstanding rod 242 which projects from a sidewall 204. Tension is supplied to pawl 240 by means of a circumferential spring 244 which surrounds rod 242. One end of spring 244 is fixed to the wall 204 and the other end is fixed to pawl 240. Pawl 240 comprises a generally L-shaped arm having an end 246 fixed to rod 242 and its other end 248 formed to project over slide 210. The leading edge 250 of end 248 is provided with a semicircular ratchet stud engaging means 251 and the trailing edge 252 is formed to provide a receptacle bypass means.

The ratchet engaging means 251 cooperates, on the return stroke of the slide 210, with a positioned ratchet stud 254 which is formed adjacent a wall of receptacle 46. The pawl and ratchet stud operate to initiate the 180° rotation of the receptacle 46. The sequence of rotation is shown in FIGS. 7—11. As the slide 210 begins to retract, the ratchet-stud-engaging means 251 contacts the ratchet stud 254, which is obviously offset from the center of rotation of the receptacle 46, and begins the rotation. The ratchet-stud-engaging means remains in contact with the ratchet stud 254 through approximately 120° to 140° of rotation whereupon it disengages and returns, under the action of spring 244, to its starting position.

Figure 10:
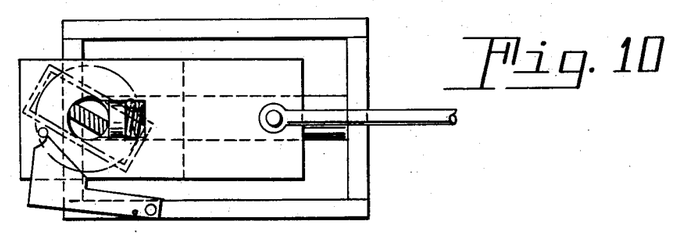
Figure 11:
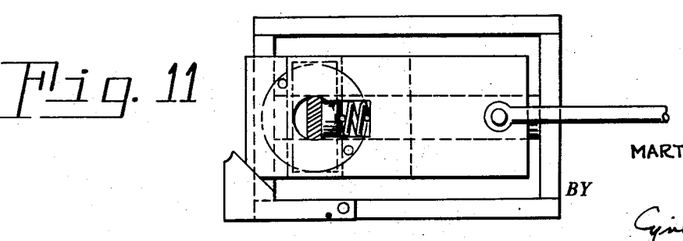

At substantially the same time as the pawl disengagement, the finishing or internal rotating means 220 takes over and finishes the rotation. This position is illustrated in FIG. 10 of the sequences. At this point, by virtue of the initial rotation having displaced the flat surface 228, the receptacle alignment slug 234, through the action of spring 238, urges the receptacle to complete the rotation. For the completion to take place, the flat surfaces 228 or 230 should be rotated past the longitudinal axis of receptacle alignment slug 234.

The movement of slide 210 is controlled by a cam 255 mounted on cam shaft 52 and suitable linkage. The linkage comprises an upstanding arm 256 mounted at one end for pivoting movement in a standard 258 fixed to base 32. A cam follower 260 is positioned intermediate the ends of arm 256. The other end 262 of arm 256 is attached to a first end of a transversely extending connecting link 264. The second end of link 264 is attached to a first end of a longitudinally extending bar 266 which has its second end fixedly attached to the base 268 of an upright rotatable rod 270. The upper end 272 of rod 270 has fixed thereto a transversely extending bar 274. The free end 276 of bar 274 is attached to a first end 278 of a connecting link 280 which has its second end 282 attached to slide 210. Thus rises and falls on cam 255 are transmitted through cam follower 260 to the end of arm 256, and translated into transverse movement of connecting link 264, longitudinal movement of bar 266, rotative movement of rod 270, transverse movement of bar 274, and longitudinal movement of link 280 which is attached to slide 210. Cam follower 260 maintains its contact with cam 255 by means of a spring 284 fixed to bar 266 and a base mounted post 286.

For a better understanding of the operation of the invention a description of one cycle is herewith rendered.

The proper size of strips to be cut is determined and the proper amount of feed is set up by the micrometer adjusters 74a and 74b which cooperate with the slides 58a and 58b. If locking screws are provided, they are set up and the micrometer adjusters backed off to avoid damage thereto.

To begin the cycle, it will be assumed that the strip feeds have already taken place. Upper cutting head 98 begins to descend through the action of cam 144 and its associated linkage. At this time, strip-advancing clamps 62a and 62b are energized and negative air is being applied to air chamber 122. The head 98 descends with the movable members 110a and 110b of head 98 contacting the fixed members 132a and 132b of lower head 100, thus clamping the strips therebetween and forming the strip retaining clamps. While the strip-retaining clamps are actuated, the air to strip-advancing clamps 62a and 62b is turned off thereby releasing the same and the strip feed slides 58a and 58b are retracted to a new position by the action of cams 72a and 72b and their associated linkage. The distance of retraction by the slides will be equal to the amount of strip material to be fed to the next cycle. The head 98 continues to descend and the fixed member 108 thereof depresses the movable member 134 of lower head 100. This action applies a pressure in the neighborhood of 500 lbs./sq.in. to achieve the desired bonding action and also severs the strips. After completing its downward travel, head 98 begins to rise. At this time, the clamps 62a and 62b are again energized so that at no time are the strips free of a clamping action. As head 98 rises, it carries with it the cut bonded pair, maintained against the cutting face 130 of fixed member 108 by virtue of the negative air being applied to the air chamber 122.

Figure 12:
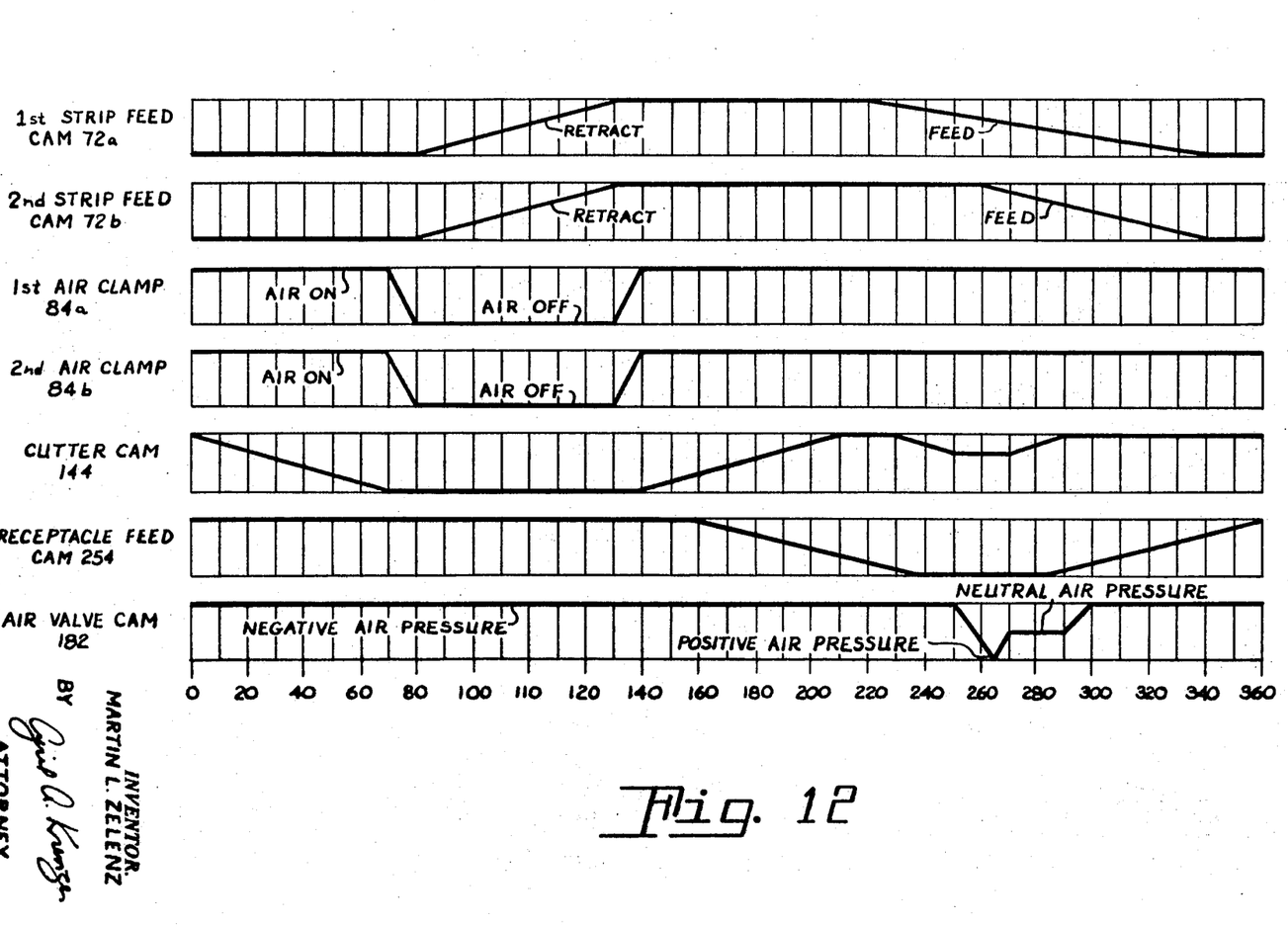
FIG. 12 is a cam chart illustrating the sequence of operation of the apparatus.

During the rise of head 98, the receptacle 46 starts to be indexed under head 98. This action continues until the receptacle 46 is positioned under head 98. Shortly before the receptacle reaches its final position, head 98 begins a partial descent to carry it to a level close to but not touching the receptacle. Simultaneously cams 74a and 74b have begun the feed of new strip segments (see chart of FIG. 12). To avoid interference of the strips during their simultaneous feed one of them, for example 36b, will be fed over the other strip. As head 98 reaches its lower position and the receptacle 46 is in its final position, air valve cam 182 actuates valve 160 and allows a puff of positive air to blow the bonded pair into the receptacle. After the puff of air, cam 182 returns to the neutral air position. The valve supplies neutral air until head 98 has returned to its full up position, after which the negative air is again applied. The absence of negative air for this period of time is to prevent any airborne contaminants being sucked from the area of the receptacle; a condition that could clog the apertures 128. After head 98 has returned to its up position, the receptacle begins to retract and, under the action of the pawl and receptacle alignment slug as described above, is rotated 180° and is prepared for the next cycle.

When the desired number of bonded pairs has been deposited in the receptacle, it may be removed and utilized as a die wherein the final compressing pressures may be applied to bond all the bonded pairs together. Thereafter, the now formed multilayer component may be baked or otherwise treated to form the final article.

Thus, it will be seen that this invention obviates many of the disadvantages of the prior art. Multilayer components of extreme accuracy are fabricated automatically, eliminating the tedious hand operations formerly associated therewith and greatly reducing the cost.

While there have been shown and described what are at present considered the preferred embodiments of the invention, it will be obvious to those skilled in the art that various changes and modifications may be made therein without departing from the scope of the invention as defined by the appended claims.

I claim:

1. An apparatus for fabricating multilayer electrical components from two different compositions of self-supporting strip material comprising: first and second strip-feeding means for feeding said strips in an overlapping manner to a particular location, said first and second strip-feeding means being oriented such that their feeding paths intersect at an angle of substantially 90°; first and second supply means for said strips operatively connected to said first and second feed means; a cutting and temporary bonding means adjacent said particular location for cutting said overlapped strips and forming a temporary bond therebetween to provide a bonded pair; means associated with said cutting means for removing said bonded pair to a position remote from said particular location; means for depositing said bonded pair in a predetermined area; and means for causing relative transverse movement between said bonded-pair-depositing means and said predetermined area for achieving alignment therebetween; and single drive means mechanically coupled to each of the aforementioned means for driving each of said aforementioned means, all of said aforementioned means being sequentially operated in a predetermined manner from a timed source.

2. The invention of claim 1 wherein said strips, when cut, have a substantially similar length and one of said strips has a width less than the other, said lesser width strip being asymmetrically disposed on said other strip whereby their edges are aligned on three sides only.

3. The invention of claim 2 wherein said predetermined area comprises: a receptacle having length and width dimensions formed to accommodate the larger of said strips and a depth sufficient to accommodate a number of said bonded pairs; and means formed to provide 180° of rotation of said receptacle between deposits of said bonded pairs.

4. The invention of claim 3 wherein said receptacle is provided with said transverse movement.

5. The invention of claim 4 wherein the means for providing said transverse movement of said receptacle comprises: a slideway; a slide mounted for movement within said slideway; means formed at one end of said slide for causing reciprocatable transverse movement thereof; and means on the other end of said slide for mounting said receptacle.

6. The invention of claim 5 wherein said receptacle-rotating means comprises: a cylindrical base for said receptacle; a cylindrical chamber formed in said slide for seating said base; a tensioned pawl mounted on a wall of said slideway for initiating rotation of said receptacle during transverse movement of said slide by engaging a ratchet stud formed adjacent said receptacle; and means formed in said slide for finishing rotation of said receptacle after said pawl becomes disengaged from said ratchet stud.

7. The invention of claim 6 wherein said means for finishing rotation of said receptacle comprises: a depending rod projecting from the underside of said cylindrical base, the lower portion of said rod being provided with opposed flat surfaces parallelly aligned with the long side of said receptacle and being separated by curved, joining surfaces; and a tensioned receptacle alignment slug positioned in said slide having a flat face formed to contact one of said flat surfaces.

8. The invention of claim 7 wherein said rotation of said receptacle takes place on the return stroke of said slide.